United States Patent [19]
Gopalkrishnan

[11] Patent Number: 5,401,786
[45] Date of Patent: Mar. 28, 1995

[54] ADDITIVE COMPOSITION FOR OIL WELL CEMENTING FORMULATIONS

[75] Inventor: Sridhar Gopalkrishnan, Woodhaven, Mich.

[73] Assignee: BASF Corporation, Parsippany, N.J.

[21] Appl. No.: 161,216

[22] Filed: Dec. 2, 1993

Related U.S. Application Data

[63] Continuation of Ser. No. 940,430, Sep. 4, 1992, abandoned.

[51] Int. Cl.$^6$ .............................................. C08K 3/00
[52] U.S. Cl. ........................................... 524/5; 524/8
[58] Field of Search ....................................... 524/5, 8

[56] References Cited

U.S. PATENT DOCUMENTS

Re. 28,722  2/1976  Sanders ................................... 524/8
4,686,252  8/1987  Burge et al. ............................. 524/3

*Primary Examiner*—Edward Cain
*Attorney, Agent, or Firm*—Nixon & Vanderhye

[57] ABSTRACT

An oil and gas well cementing composition has styrene/butadiene latex and a combination of nonionic and anionic surfactants for improved physical properties, especially fluid loss.

23 Claims, No Drawings

ADDITIVE COMPOSITION FOR OIL WELL CEMENTING FORMULATIONS

This is a continuation of application(s) Ser. No. 07/940,430, filed on Sep. 4, 1992, now abandoned.

FIELD OF THE INVENTION

The present invention relates to an improved oil and gas well cementing composition having a synergistic combination of nonionic and anionic surfactants which in particular improves the fluid loss, free water and rheological properties and provides good compressive strength of the resulting cementing composition. The invention also relates to the use of certain nonionic and anionic surfactants as additives for improving oil and gas well cementing compositions.

BACKGROUND OF THE INVENTION

The initial step in the recovery of hydrocarbons and gases from underground formations is the placement of the cement slurry, usually including cement, water and other additives, in the annular space between the porous formation and the steel casing. The main purpose of the cement in this annular space is to support the casing and also restrict fluid movement between formations. This process is referred to as primary cementing. The most important requirements to insure a satisfactory cementing job are that a highly homogenous cement is present in the annulus and that strong bonds develop between the rock formation, cement and steel casing.

In order for this to happen, one must insure that the composition of the cement slurry pumped downhole does not change greatly during the whole cementing process. Therefore, contamination of the cement slurry by the drilling mud used in the previous operation or excessive loss of water to the formation must be carefully avoided. A well-formulated cement slurry will, therefore, exhibit low fluidloss to the formation, give either zero or very low free-water, have a viscosity low enough to be pumpable, set to a hardened mass within the desired time interval and provide adequate compressive strength to support the casing.

The free water of a slurry is simply the supernatent fluid formed on top of the slurry column which provides an indication of the amount of settling of the cement particles during slurry placement. Excessive free water on top of the cement column will result in an incompetent zone close to the top of the liner which will have to be remedied with an expensive squeeze job. The viscosity of the slurry describes the rheological behavior of the slurry, which is determined by measuring the plastic viscosity (pv) and the yield point (yp) of the slurry. The cement slurry should be fluid and pumpable until it is in place, then it should start to set as soon as possible after placement. Any delay in the development of compressive strength will increase the "waiting on cement" time (WOC) necessary before proceeding with the next operation. The thickening time (TT) is used to describe the point at which the gelation of the cement has proceeded to such an extent so as to affect the pumping rates.

Neat cement slurries have a fluidloss which varies from 700 to 2500 mL over a thirty minute period. This rate of loss will result in rapid dehydration and incorrect placement of the slurry and consequently will lead to failure of the whole cementing job. In order to attempt the control of fluid loss from the cement slurry to the surrounding rock formation, the permeablity of the cement matrix must be reduced. This is achieved by addition of additives which provide excellent fluid loss control but at the same time do not adversely affect other properties of the slurry, such as free water, rheology, thickening times and compressive strength.

Commercial fluid loss additives based on cellulosic polymers such as hydroxyethylcellulose (HEC) provide fairly good fluid loss control but there some obvious drawbacks associated with cellulosic polymers. Typical loadings of these polymers to achieve good fluid loss control are in the range of 0.5 to 1% by weight of cement. Such high loadings results in a dramatic increase in the plastic viscosity and the yield point of the slurry, which translates to an increase in the energy needed to pump the slurry downhole. This means that every improvement in the fluidloss brought about by an increase in the level of the cellulosic polymer has to be paid for with high pumping pressures. Other drawbacks of cellulosic polymers include retardation in the thickening times of slurries and also the instability of these polymers at high temperatures, which limits their usefulness as a fluid loss additive to wells cooler than 200 degrees F.

Synthetic polymers based on acrylamide and polyvinylpyrrolidone have been considered by the industry as additives for fluid loss control in cement compositions, but they 15 have not come into wide spread use because of certain inherent drawbacks. Both acrylamide and polyvinyl pyrrolidone are prone to hydrolysis in the alkaline environment of the cement composition and therefore cause excessive retardation in the development of cement compressive strength. Furthermore polyvinylpyrrolidone is expensive and has a strong flocculating behavior which makes it an unattractive candidate as an additive in cement compositions. The synthetic polymers used as fluid loss additives are typically high molecular weight polymers which are quite expensive and this limits the amount of polymeric additive the can be added to the cement composition. Even if the cost factor is overlooked, high loadings of synthetic polymers may give improved fluid loss properties but often lead to viscous slurries which require increased pumping energy.

The art is replete with copolymers which function as additives in cement compositions, but the inherent drawbacks associated in the form of undesirable side effects in the case of cellulosic and some synthetic polymers, coupled with the high cost of synthetic polymers have severely curtailed their widespread use in the industry.

As heretofore noted, slurry compositions for oil and gas well cementing typically require that the slurry be fluid enough to be pumpable. This means that the plastic viscosity of the slurry should be less than 100 centipoises (cps), and more preferably less than 50 cps. In addition, the yield point of the slurry should be less than 20 lbs/100 ft$^2$ the fluid loss be less than 50 mL/30 minutes and the freewater be less than or equal to 3 mL over a two hour standing period. Cementing compositions meeting these requirements can be extremely difficult to design, and often times do not meet all of these requirements.

Certain cementing compositions which contain anti-gas channeling additives have been described in the art. For example, Parcevaux et al., U.S. Pat. No. 4,537,918, describes a cement composition which contains styrene-butadiene latex, as well as a stabilizer. The stabilizer is described as an anionic component of the cement composition which is selected from the group of lignosulfonates and their partly desulfonated derivative, sulfonic acid or sulfite modified melamine-formaldehyde resins, formaldehyde/sulfonate naphthalene resins, and condensation products of bi-nuclear sulfonated phenols and of formaldehyde. Each compound in this recited class of stabilizers is thus required to be anionic and to include a compound which contains sulphur in its molecule.

In Parcevaux et al., U.S. Pat. No. 4,721,160, there is also described a cement slurry composition which contains a styrene butadiene latex and a stabilizer. However, the patentees limit their additive for use with a resulting cement composition having a specific gravity within the range of 1.2 to 1.6, i.e. a lightweight cement slurry composition.

In addition, U.S. Pat. No. RE 28,722 reissued to Sanders, U.S. Pat. No. 3,043,790, describes a cement mortar composition which includes a styrene butadiene additive system having three necessary additives. These include a nonionic surfactant, an ionic surfactant and a polyorganosiloxane fluid surfactant. The preferred nonionic surfactants include condensation products of ethylene oxide with phenols, naphthols, and alkyl phenols, for example octyphenoxy-nonaoxyethyleneethanol. There appears to be no mention made of the use of this particular composition in oil and gas well cementing applications.

There presently exists a need in the art for an additive system which is relatively inexpensive, and provides superior fluid loss control via a synergistic combination of nonionic and anionic surfactants, without adversely affecting other critical properties of the cement slurry for oil and gas well cementing.

OBJECTS OF THE INVENTION

It is therefore an object of the present invention to provide a cementing composition for use in oil and gas wells which comprises a synergistic combination of nonionic and anionic surfactants which improves several of the physical properties of the cement composition.

It is also an object of the invention to provide for the use of certain nonionic and anionic surfactants as additives to improve cementing compositions used in the drilling industry.

Another object of the present invention is to utilize certain nonionic and anionic surfactants in combination with styrene-butadiene latex and cement which gives a readily mixable cement slurry for use in oil and gas wells.

A further object of the invention is to provide a cement composition having nonionic and anionic surfactant additives to achieve a set of rheological properties which makes it readily pumpable.

Still another object of the invention is to have an oil and gas well cementing composition which gives very low fluid loss over a thirty minute interval.

Another object is to have a cementing composition which provides low free water values.

A further object is to have a cement slurry composition which is not subject to excessive retardation, and which has good compressive strength.

SUMMARY OF THE INVENTION

These and other objects of the invention are achieved by providing an oil and gas well cementing composition which is made up of cement, and a styrene/butadiene latex in an amount of from about 5% to about 30% by weight of the dry cement, that is, without water. The ratio of styrene to butadiene in the latex is typically about 2:1.

As part of the composition there is also from about 0.05% to about 2%, more preferably from about 0.08% to about 0.7%, and even more preferably from about 0.1% to about 0.5% of the nonionic surfactant alkylphenol ethoxylate having a molecular weight of from about 1000 to about 3000 and having from about 25 to about 50 moles of ethylene oxide (EO) (n equals about 25 to about 50). The alkylphenol ethoxylate has the following formula:

$$R-C_6H_5-O-[CH_2-CH_2-O]_n-H$$

where R is a butyl, pentyl, hexyl, heptyl, octyl, nonyl or decyl group. In a preferred embodiment of the invention, the alkylphenol ethoxylate has a molecular weight range of from about 1300 to about 2500, and even more preferably from about 1500 to about 2200. The moles of ethylene oxide (value of n) are preferably from about 28 to about 45, and even more desirably from about 30 to about 40. In an especially preferred embodiment, the molecular weight is about 1730 and the moles of EO are about 35. It is in this embodiment that the alkylphenol ethoxylate is octylphenolethoxylate.

In combination with the heretofore alkylphenol ethoxylate, there is also from about 0.01% to about 2% of one or more anionic surfactants from the group of polyacrylic acid homopolymers of the following formula:

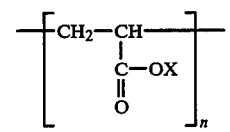

$$\left[ -CH_2-CH \begin{array}{c} | \\ C-OX \\ \| \\ O \end{array} \right]_n$$

where X is an alkali metal, preferably sodium, or hydrogen; and n is a number such that the molecular weight of the polymer is in the range of from about 1,000 to about 250,000.

Water makes up the remainder of the cement composition in an amount such that the total quantity of water is from about 30% to about 60% by weight of the dry cement. Unless otherwise specified, all quantities of individual components of the cement composition are expressed in terms of weight percentage based on the weight of the dry cement. All molecular weights are expressed as weight average molecular weight or $M_W$.

Further provided as part of the invention is the use of the heretofore described alkylphenol ethoxylates in combination with at least one of the heretofore described anionic surfactant additives as stabilizer additives in oil and gas well cementing compositions.

Also provided is a method of improving the rheological properties of cementing compositions which comprises adding the heretofore nonionic and anionic surfactant stabilizer additives in the quantities set forth.

It has now been discovered that the synergistic combination of alkylphenol ethoxylate with one or more of the heretofore anionic surfactants provides measurable improvements in the plastic viscosity, yield point, fluid loss, and freewater values, as well as other physical properties of cement compositions used in drilling oil and gas wells. The nonionic and anionic surfactants as part of the invention function as stabilizers in the cement composition by stabilizing the styrene-butadiene dispersion. In this way, they provide a well dispersed cement matrix which effectively controls the loss of fluid from the cement slurry composition.

DETAILED DESCRIPTION OF THE PREFERRED EMBODIMENTS

The cement utilized as part of the composition according to the invention is any of the known cements available to those skilled in the art of oil and gas well cementing. Of these, American Petroleum Institute (API) Class H is preferred. Particularly preferred is Texis Lehigh Class H cement available from the Texis Lehigh Company of Buda, Tex.

The styrene/butadiene latex is added to the cement in an amount of from about 5% to about 30% based on the weight of the cement. In a preferred embodiment, the latex comprises from about 8% to about 25% most desirably, about 15% by weight of the cement. The ratio of styrene to butadiene in the latex is typically about 2:1, although a somewhat higher or lower ratio is certainly within the scope of the invention. In most instances, a dispersion of about 50% of the active polymer styrene/butadiene is formed with about 50% water, and this dispersion in turn is added to the cement.

Styrene/butadiene latexes are considered to be very compatible with cement. These latexes are typically manufactured via an emulsion polymerization process to yield a dispersion with an average of about 50% latex polymer content, the remainder being water. Since these dispersions have a relatively high percentage of active polymer, it is possible to utilize a high loading in cement compositions in order to obtain a uniform well-dispersed cement matrix. It is this cement matrix that effectively controls the loss of fluid from the cement composition. Since the styrene-butadiene polymer is dispersed in the aqueous medium, it is possible to use high loadings of the polymer without imparting high viscosity to the cement slurry.

As part of the invention, there is also included a nonionic alkylphenol ethoxylate surfactant additive as a stabilizer. It is especially desirable that this surfactant be octylphenol ethoxylate with a molecular weight in the range of from about 1500 to about 2200, and having from about 30 to about 41 moles of ethylene oxide (EO). Especially preferred is octylphenol ethoxylate having a molecular weight of about 1730 and about 35 moles of EO. Octylphenol ethoxylate is octylphenol to which ethylene oxide is added. The octylphenol ethoxylate has the following formula:

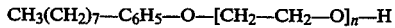

wherein n has a value of from about 30 to about 41. This component is added in an amount of from about 0.05% to about 2% based on the weight of the cement. In a preferred embodiment, the octylphenol ethoxylate is added in an amount of from about 0.08% to about 0.7%, even more preferably from about 0.1% to about 0.5%. Particularly preferred for use with the composition according to the invention is the octylphenol ethoxylate available from BASF Corporation and marketed under the tradename ICONOL OP 30 or 40. This product may also be known under the name TRITON X 405, which is available from Union Carbide.

In combination with octylphenol ethoxylate is added about 0.01% to about 2% of one or more anionic surfactants from the group of polyacrylic acid homopolymers of the following formula:

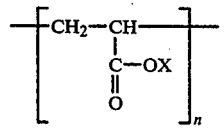

where X is an alkali metal, preferably sodium, or hydrogen. n is a number such that the molecular weight of the polymer is in the range of from about 1,000 to about 250,000, more preferably in the range of from about 10,000 to about 150,000, and even more preferably from about 15,000 to about 100,000. Particularly preferred is the anionic surfactant having a molecular weight of about 15,000.

The anionic homopolymer(s) is added to the cement composition in amounts of from about 0.01 to about 2% by weight, preferably from about 0.03 to about 0.3%, and more preferably in the range of from about 0.05 to about 0.25%. In an especially preferred embodiment of the invention, the cement composition has about 0.08 to about 0.18% of anionic homopolymer.

Water is also added to the cement composition in amounts of from about 30% to about 60%, preferably from about 36% to about 42%, and more preferably about 38% by weight of the cement.

One or more defoamers may also be added to the various embodiments of the cement composition as part of the invention. These are added for their deairentrainment properties imparted to the resulting cementing composition. Any one of a number of defoamers available to those skilled in the art may be utilized. Preferred for use is the defoamer available from BASF Corporation under the trademark PLURACOL ® 4010. This is a polypropylene glycol with an average molecular weight of about 3300. The defoamer is typically added to the composition in an amount of from about 0.01% to about 0.1% based on the weight of the cement.

In some instances certain other additives known as retarders or accelerators may be added to the cement composition to adjust the thickening time of the cement slurry for the drilling operation. Because "Waiting on Cement" (WOC) is very expensive these additives are often added in quantities of from about 0.5 to about 1.5%. U.S. Pat. No. 4,527,918 describes many of the known accelerators and retarders available to those in the art, and the salient portions thereof are incorporated herein by reference. Sometimes in addition to these additives, silica flour is added in amounts of from about 30% to about 35% by weight of the cement if the temperature of the oil well is greater than 220 F. Since Portland cement experiences strength retrogression at high temperatures, silica flour can be added to increase the compressive strength of cement.

The physical properties of the cement slurry compositions according to the various embodiments of the invention should be as follows: the fluidloss should be less than about 55 mL/30 minutes, preferably less than about 50 mL/30minutes, and more preferably less than about 40 mL/30 minutes. The plastic viscosity of the composition should be less than about 100 cp, and more preferably less than about 50 cp. Additionally, the yield point should be less than about 20 lbs/100 ft². The freewater value should be less than or equal to about 3 mL for a two hour standing period, preferably less than about 2 mL, and more preferably less than about 1 mL.

The following example will illustrate how to make the cement composition according to one embodiment of the invention. This example should not be construed as limiting the scope of the invention.

EXAMPLE 1

To a Waring blender, approximately 327 mL of water is added. Next, about 0.35 grams of defoaming agent and 1.3 grams of the nonionic surfactant TRITON X 405 are added and this mixture is allowed to stir at low speed (1000 rpm). If the anionic surfactant stabilizer is liquid, approximately 1.3 grams is also added along with the TRITON X 405 at this point. Next, approximately 131 grams of styrene/butadiene latex is added. If the second stabilizer is a solid it is first blended with about 860 grams of dry cement and the resulting mixture is added to the solution within 10 seconds with the stirring maintained at 4000 rpm. Soon after the cement mixture is added, stirring is increased to 12,000 rpm and the mixture is allowed to stir for 35 seconds after which stirring is stopped. Rheology measurements are made at room temperature after which the slurry is homogenized in an atmospheric consistometer for twenty minutes at the desired operating temperature. The pourability of the slurry is determined at this point. If after twenty minutes of stirring the resulting slurry is so thick that it does not pour out of the consistometer, then the slurry is discarded and no further tests are performed. If the slurry is homogenous and pourable then routine cement testing is then performed.

EXAMPLE 2

The following API Tests at the indicated temperatures were performed with the composition according to various embodiments of the invention. The compositions performed extremely well based upon several measurable parameters. These tests further highlight the use of the nonionic and anionic surfactant stabilizer additives as part of the cement compositions according to the invention. Measurements were based on the following:

Fluidloss

Thirty minute fluidloss values were measured under static conditions using a high temperature, high pressure filter press made by Bariod. All tests were conducted at 1000 psi using nitrogen as the pressurizing gas.

Freewater

The amount of freewater was determined by measuring the amount of water present on top of a 250 mL graduated cylinder filled with cement slurry, after a two hour standing period at room temperature.

Rheology

Rheological properties were measured using Chan 35 Viscometer equipped with a R1 rotor sleeve and a B1 bob. All measurements were made at room temperature on freshly prepared slurries.

Thickening Time

Atmospheric thickening times were measured with a Chandler atmospheric consistometer set to the desired test temperature. The reported value indicates the length of time taken by the slurry to achieve a consistency of 70 Bc.

Latex Loadings 15.3% BWOC=1.73 gallons/sack (BWOC=Based on Weight of Cement) 10.2% BWOC=1.15 gallons/sack 8.1% BWOC=0.92 gallons/sack Those skilled in the art may find that the loading of latex may vary somewhat depending upon individual oil well conditions.

API Test at 180 degrees F. (with the polyacrylic acid homopolymer anionic surfactant as part of the invention) Cement Slurry, Composition (%'s Based on Weight of Cement, or BWOC):

| | |
|---|---|
| Texas Lehigh Class H Cement: | 860 grams |
| Styrene/Butadiene Latex: | 15.3% |
| Defoamer: | 0.04% |
| Water: | 38% |
| TRITON X405 | 0.153% |
| anionic surfactant | 0.153% |
| API Fluidloss at 30 minutes: | 58 mL |
| Freewater: | 2 mL |
| Plastic Viscosity (cps): | 24 |
| Yield Point (lbs/100 ft$^2$) | 3.2 |

These results demonstrate that the fluidloss value is lower than 60 mL for a typical latex loading of 1.73 gallons/sack at a temperature of 180 F. The freewater value is lower than or equal to 3 mL at the temperature set forth above. The plastic viscosity value is lower than 50 cps, and the yield point value is below 25 lbs/100 ft$^2$.

EXAMPLE 3

In order to fully assess the efficacy of the cement composition according to the invention, comparative tests were done utilizing:
1) no surfactant stabilizer additive
2) formaldehyde/sulfonate naphthalene resin alone (anionic surfactant disclosed in U.S. Pat. No. 4,537,918)
3) TRITON X 405 nonionic surfactant alone
4) TRITON X 405 nonionic surfactant with 2) above
5) anionic surfactant as part of the invention alone In each test, 860 grams of Texis Lehigh Class H Cement was utilized. 15% of styrene/butadiene latex, 0.04% of defoamer, and 38% of water was also utilized (all %'s BWOC). The fluid loss values were as follows at 180 degrees F.:

API Fluid loss at 30 minutes 1) no surfactant stabilizer additive—fluid loss could not be measured as cement slurry could not be poured.
2) 0.153% sodium naphthalene sulfonic acid condensate with formaldehyde alone (anionic surfactant disclosed in U.S. Pat. No. 4,537,918)—fluid loss was 138 mL.
3) 0.153% TRITON X 405 nonionic surfactant alone—fluid loss was 130 mL.
4) 0.153% TRITON X 405 nonionic surfactant with 1% 2) above
   fluid loss was 112 mL.
5) 0.153% anionic surfactant as part of the invention alone—fluid loss was 150 mL.

Examples 2 and 3 demonstrate the synergistic interaction between the nonionic and anionic surfactants as part of the claimed invention according to the various embodiments thereof. These surfactant additives lead to the stabilization of the styrene/butadiene dispersion in the cement matrix. By virtue of this stabilization, a compact cement matrix is formed which controls the loss of fluid from the cement slurry.

While the invention has been described in each of its embodiments, it is expected that certain modifications thereto may be made by those skilled in the art without departing from the true spirit and scope of the invention, as set forth in the specification and the accompanying claims.

What is claimed is:

1. an oil and gas well cementing composition consisting essentially of:
    a) cement;
    b) styrene/butadiene latex in an amount of from about 5% to about 30% by weight of said cement;
    c) from about 0.05% to about 2% by weight of a nonionic surfactant stabilizer additive which is an alkylphenol ethoxylate of the following formula:

$$R-C_6H_5-[CH_2-CH_2-O]_nH$$

wherein R is butyl, pentyl, hexyl, heptyl, octyl, nonyl or decyl, said alkylphenol ethoxylate having a molecular weight of from about 1000 to about 3000 such that n equals from about 25 to about 50;
    d) from about 0.01% to about 2% by weight of at least one anionic surfactant stabilizer additive selected from the group consisting of polyacrylic acid homopolymer consisting of repeat units of the formula:

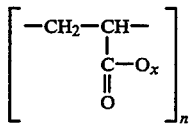

wherein x is an alkali metal or hydrogen, and n is a number such that the molecular weight of said homopolymer is from about 1000 to about 250,000; and
    e) water in an amount such that the total quantity of water is from about 30% to about 60% by weight of said cement, and wherein
    said composition has a fluid loss of less than about 60 mL/30 minutes.

2. The composition as claimed in claim 1, wherein said additive c) is present in an amount of from about 0.08 to about 0.7%.

3. The composition as claimed in claim 2, wherein said additive c) is present in an amount of from about 0.1 to about 0.5%.

4. The composition as claimed in claim 1, wherein said additive d) is present in an amount of from about 0.03 to about 0.3%.

5. The composition as claimed in claim 4, wherein said additive d) is present in an amount of from about 0.05 to about 0.25%.

6. The composition as claimed in claim 5, wherein said additive d) is present in an amount of from about 0.08 to about 0 18%.

7. The composition as claimed in claim 1, further consisting essentially of one or more defoamers in an amount of from about 0.01 to about 0.1% based on the weight of said cement.

8. The composition as claimed in claim 1, said composition having a plastic viscosity of less than or equal to about 100 centipoises.

9. The composition as claimed in claim 8, said composition having a plastic viscosity of less than or equal to about 50 centipoises.

10. The composition as claimed in claim 1, said composition having a freewater value of less than or equal to about 3 mL over an approximately 2 hour standing period.

11. The composition as claimed in claim 1, said composition having a yield point value of less than or equal to 20 lbs/100 ft$^2$.

12. The composition as claimed in claim 1, wherein said alkylphenol ethoxylate has a molecular weight range of from about 1300 to about 2500, and n equals from about 28 to about 45.

13. The composition as claimed in claim 12, wherein said alkylphenol ethoxylate has a molecular weight range of from about 1500 to about 2200, and n equals from about 30 to about 40.

14. The composition as claimed in claim 13, wherein said alkylphenol ethoxylate is octylphenol ethoxylate having a molecular weight of about 1730, and n equals about 35.

15. The composition as claimed in claim 1, wherein said additive d) has a molecular weight in the range of from about 10,000 to about 150,000.

16. The composition as claimed in claim 15, wherein said additive d) has a molecular weight in the range of from about 15,000 to about 100,000.

17. The composition as claimed in claim 16, wherein said additive d) has a molecular weight in the range of about 15,000.

18. A method of improving the rheological properties of oil well cementing compositions which comprises adding the stabilizer additives c) and d) of claim 1.

19. The composition as claimed in claim 1, said composition having a fluid loss of less than about 40 mL/30 minutes.

20. The composition as claimed in claim 1, said composition having a fluid loss value of under 60 mL/30 minutes.

21. The composition as claimed in claim 20, said composition having a fluid loss value of 58 mL/30 minutes.

22. An aqueous oil and gas well cementing composition consisting essentially of:
    cement;
    a styrene/butadiene latex in an amount of from about 5% to about 30% by weight of said cement;
    water in an amount from about 30% to about 60% by weight of said cement; and
    a stabilizer package consisting essentially of a nonionic component and an anionic component, wherein
    (i) said nonionic component is present from about 0.05% to about 2% by weight and is a nonionic octylphenol ethoxylate having a weight average molecular weight of from about 1500 to about 2200, and having between about 30 to about 40 moles of ethylene oxide per mole of octylphenol; and wherein
    (ii) said anionic component is present from about 0.01% to about 2% by weight and is a polyacrylic acid homopolymer consisting of repeat units of the formula:

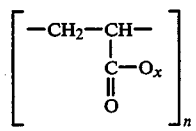
wherein x is an alkali metal or hydrogen, and n is a number such that the weight average molecular weight of said polyacrylic acid homopolymer is about 15,000; and wherein
said stabilizer package is present in an amount to impart low fluid loss characteristic to said composition of less than 60 mL/30 minutes.
23. The composition as in claim 22, wherein said alkali metal is sodium.
* * * * *